(12) United States Patent
Byrne et al.

(10) Patent No.: US 10,483,737 B2
(45) Date of Patent: Nov. 19, 2019

(54) ELECTRICAL BOX WITH DUAL-HINGED COVER

(71) Applicants: Norman R. Byrne, Ada, MI (US); Joel T. Ruiter, Ada, MI (US); Peter Bergendahl, South Burlington, VT (US); Joseph D. Ward, Grand Rapids, MI (US); Juan Carlos Angulo, Grand Rapids, MI (US)

(72) Inventors: Norman R. Byrne, Ada, MI (US); Joel T. Ruiter, Ada, MI (US); Peter Bergendahl, South Burlington, VT (US); Joseph D. Ward, Grand Rapids, MI (US); Juan Carlos Angulo, Grand Rapids, MI (US)

( * ) Notice: Subject to any disclaimer, the term of this patent is extended or adjusted under 35 U.S.C. 154(b) by 0 days.

(21) Appl. No.: 16/250,086

(22) Filed: Jan. 17, 2019

(65) Prior Publication Data

US 2019/0222009 A1 Jul. 18, 2019

Related U.S. Application Data

(60) Provisional application No. 62/618,625, filed on Jan. 17, 2018.

(51) Int. Cl.
*H02G 3/08* (2006.01)
*H02G 3/14* (2006.01)

(52) U.S. Cl.
CPC .............. *H02G 3/081* (2013.01); *H02G 3/14* (2013.01)

(58) Field of Classification Search
CPC .................................. H02G 3/081; H02G 3/14

USPC ......................................................... 174/560
See application file for complete search history.

(56) References Cited

U.S. PATENT DOCUMENTS

| | | | |
|---|---|---|---|
| 550,338 A | 11/1895 | Bauer | |
| 3,290,719 A | 12/1966 | Courson | |
| 3,685,093 A | 8/1972 | Sanders et al. | |
| 4,132,034 A | 1/1979 | Van Siclen | |
| 4,414,576 A | 11/1983 | Randmae | |
| 5,195,272 A | 3/1993 | Yamada | |
| 5,355,556 A | 10/1994 | Lyon | |
| 5,548,927 A | 8/1996 | Song | |
| 5,647,652 A | 7/1997 | Zalewski et al. | |
| 5,926,916 A | 7/1999 | Lee et al. | |
| 6,003,716 A | 12/1999 | Allison et al. | |
| 6,806,426 B1 * | 10/2004 | Gretz | H02G 3/14 174/481 |
| 9,450,390 B1 * | 9/2016 | Flegel | H02G 3/081 |

(Continued)

*Primary Examiner* — Sherman Ng
(74) *Attorney, Agent, or Firm* — Gardner, Linn, Burkhart & Ondersma LLP

(57) ABSTRACT

An electrical box supports one or more electrical or electronic data outlets in a cavity, with a dual-hinged door at least partially covering an opening to the cavity when the door is closed. The door is openable in either of two directions by pivoting it about either of two spaced-apart pivot axes that are defined by respective pivot arms coupled to opposite ends and opposite sides of the door, the pivot arms being further coupled at their respective proximal ends to opposite walls of the housing. A retaining feature releasably secures the door in the closed position and may provide sensory feedback to a user upon closing the door. Optionally, the door has a floating appearance in the opening to the cavity, with no direct contact existing between the door and the housing.

20 Claims, 11 Drawing Sheets

(56) References Cited

U.S. PATENT DOCUMENTS

2008/0110661 A1* 5/2008 Dinh .................. H01R 13/5213
                                                    174/53
2008/0296039 A1* 12/2008 Dinh .................... H01R 13/447
                                                    174/58
2010/0181091 A1* 7/2010 Drane .................... H02G 3/088
                                                    174/66

* cited by examiner

SECTION A-A

SECTION B-B

ELECTRICAL BOX WITH DUAL-HINGED COVER

CROSS REFERENCE TO RELATED APPLICATION

The present application claims the benefit of U.S. provisional application Ser. No. 62/618,625, filed Jan. 17, 2018, which is hereby incorporated herein by reference in its entirety.

FIELD OF THE INVENTION

The present invention relates to electrical power and/or data distribution units for mounting at or along or within work surfaces, furnishings, and the like.

BACKGROUND OF THE INVENTION

Electrical power outlets and/or electronic data outlets are commonly provided at work surfaces for use by persons located at or near the work surface. In some cases, it is desirable to provide selective access to electrical power and/or electronic data outlets so that users have the option of limiting or precluding access to the outlets, such as when the outlets are not needed, or for aesthetic reasons.

SUMMARY OF THE INVENTION

The present invention provides an electrical power and/or electronic data center for a work surface, which has a lid or cover that can alternately be opened in either of two directions about either of two spaced-apart pivot axes that are defined in part by a pair of spaced-apart pivot arms. During normal use, when the lid or cover is pivoted open in a first direction about a first pivot axis, it is incapable of pivoting about the second pivot axis until the lid or cover has first been closed. Likewise, during normal use when the lid or cover is pivoted open in a second direction about the second pivot axis, it is incapable of pivoting about the first pivot axis until the lid or cover has first been closed. Optionally, magnets are used to provide a latching function plus sensory ("haptic") feedback to a user, indicating when the cover has been fully closed and can again be opened in either direction.

In one form of the present invention, an outlet box with dual-hinged cover includes a housing, a cover, a pair of pivot arms for securing the cover to the housing, and a retaining element for releasably securing the cover in a closed position. The housing defines an opening to a cavity and includes a pair of spaced-apart sidewalls. The cover is positionable inside an opening in the housing, and may have a floating appearance with no direct contact between the cover and the housing. The pivot arms are positioned at opposite sides of the cover, and have respective distal end portions pivotably coupled to the cover at opposite ends of the cover. The pivot arms have proximal end portions pivotably coupled to respective ones of the sidewalls. The cover is openable from the closed position in a first direction about a first pivot axis that extends through the proximal end portion of a first pivot arm, and the cover is alternately openable from the closed position in a second direction about a second pivot axis that extends through the proximal end portion of a second pivot arm.

Optionally, a retaining element is positioned at each of the pivot arms, and a corresponding retaining element is positioned at each of the sidewalls. Each of the corresponding retaining elements is configured to interact with a corresponding one of the retaining elements to releasably secure the cover in a closed position, and to provide sensory feedback to a user as the cover moves from an open position to the closed position.

Thus, the outlet box provides convenience access to electrical or electronic outlets at a work surface or the like, from opposite sides of the outlet box. Its dual-hinged door may have a floating appearance with no direct contact between the door and the housing, even with the door closed, and the door may be closed while power and/or data cords are extending out of the housing past the door.

These and other objects, advantages, purposes and features of the present invention will become apparent upon review of the following specification in conjunction with the drawings.

BRIEF DESCRIPTION OF THE DRAWINGS

FIGS. 6A and 6A1 are side sectional elevations taken along line A-A in FIG. 6, with FIG. 6A1 being an enlarged view;

DESCRIPTION OF THE PREFERRED EMBODIMENTS

Figure 1A:
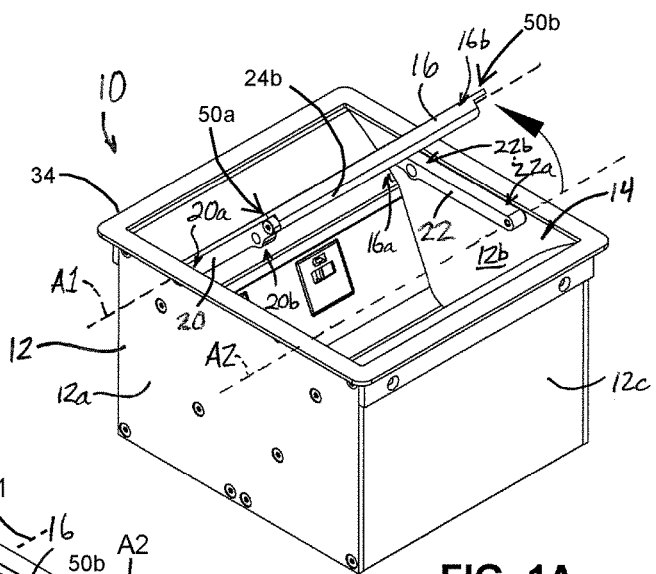
FIG. 1A is a top perspective view of an electrical box with dual-hinged cover in accordance with the present invention, viewed from front-right and shown with the cover in a first open position.

Referring now to the drawings and the illustrative embodiments depicted therein, an electrical power and/or electronic data center 10 is configured for mounting in or along a work surface, a furniture article, or the like. Although the electrical power and/or electronic data center 10 may be referenced herein as an "electrical box," it will be appreciated that the unit may be adapted to carry for high and/or low voltage electrical power outlets, electronic data outlets, pass-throughs, functional electronic devices, or combinations thereof. Electrical box 10 includes a main housing 12 having an open upper end 14, which is fitted with a lid or cover 16 that can alternately be opened in either of two directions from a closed position, such as shown in FIGS. 1A-2C.

Cover 16 may be lifted and pivoted about either of two spaced-apart pivot axes A1, A2 (FIGS. 1A-2C) that are defined in part by a pair of spaced-apart pivot arms 20, 22. The first pivot arm 20 has a proximal end 20a that is pivotably coupled to a first sidewall 12a of housing 12, and a distal end 20b that is pivotably coupled to a second end 16b of the cover 16. The second pivot arm 22 has a proximal end 22a that is pivotably coupled to a second sidewall 12b of housing 12, and a distal end 22b that is pivotably coupled to a first end 16a of the cover 16. Cover 16 is mechanically attached to each of the pivot arms 20, 22 only at each pivot arm's respective distal end 20b, 22b.

Figure 5:
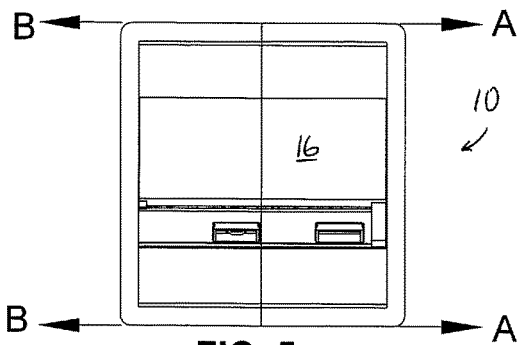
FIG. 5 is a top plan view of the electrical box with the cover in the first open position.
Figure 5A:
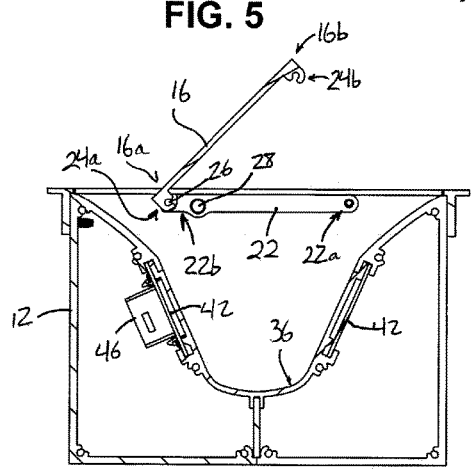
FIGS. 5A and 5A1 are side sectional elevations taken along line A-A in FIG. 5, with FIG. 5A1 being an enlarged view.
Figure 5B:
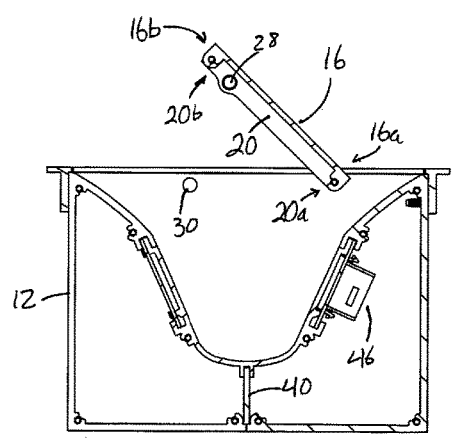
FIG. 5B is a side sectional elevation taken along line B-B in FIG. 5.
Figures 1, 5A:
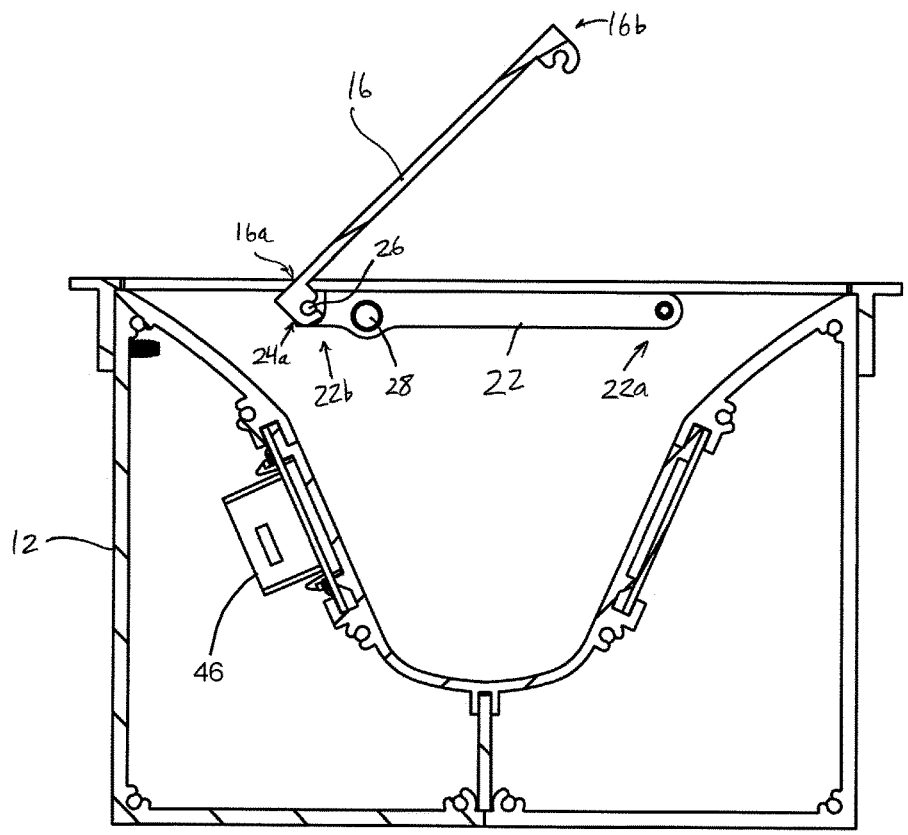
Figures 1, 6A:
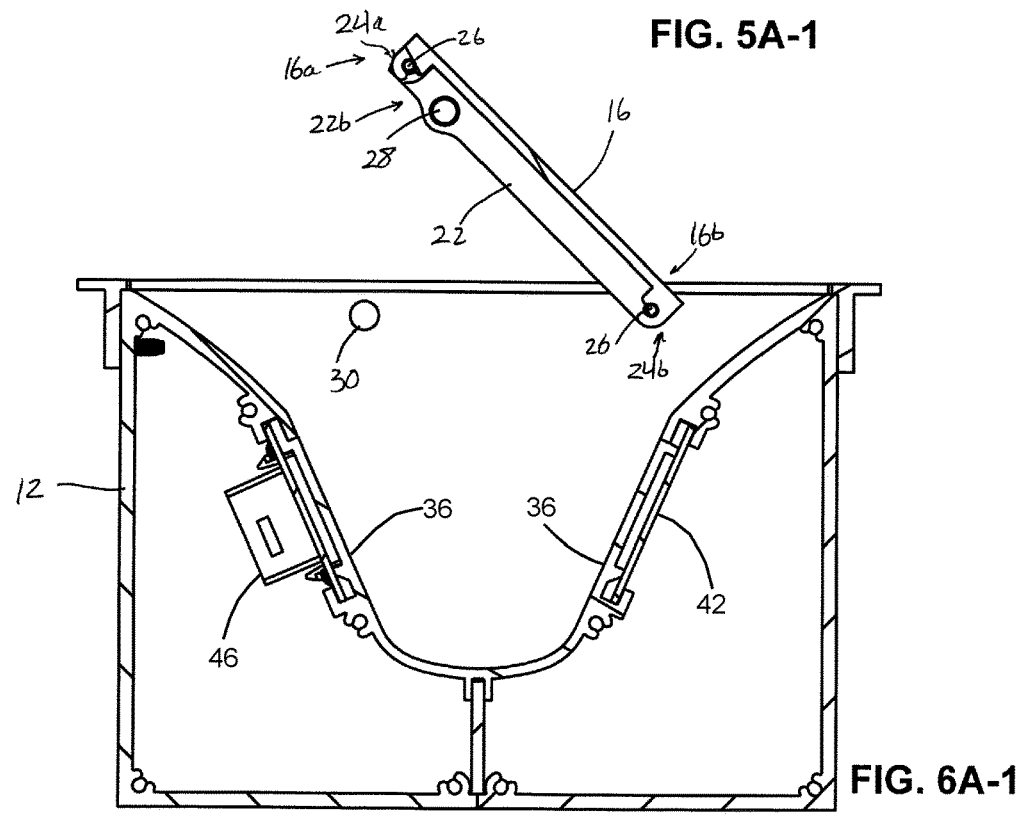

This configuration of pivot arms 20, 22 limits movement of the cover 16 during normal use so that when the cover 16 is pivoted open in a first direction (curved arrow in FIG. 1A) about a first pivot axis A1, it is substantially prevented from pivoting about the second pivot axis A2 until the cover 16 has first been closed. This is because when cover 16 is in the first open configuration of FIG. 1A, the pivot connection between the proximal end 20a of first pivot arm 20 and first sidewall 12a prevents cover 16 from being lifted away from the housing 12 and restricts the cover's movement to only pivoting about the first pivot axis A1. A snap-on hook 24a formed at the first end 16a of cover 16 secures the cover to a pivot pin 26 along the first pivot axis A1, such as shown in FIGS. 5A and 5A-1.

Figure 6A:
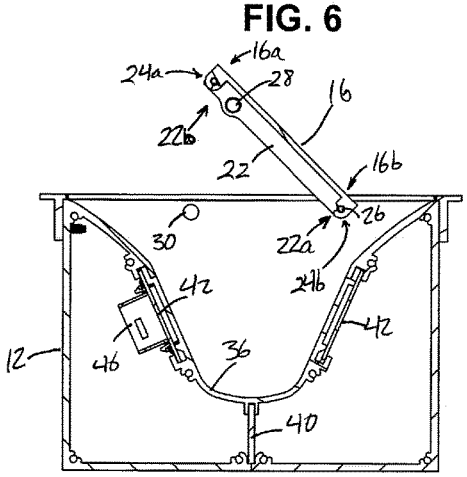
Figure 6B:
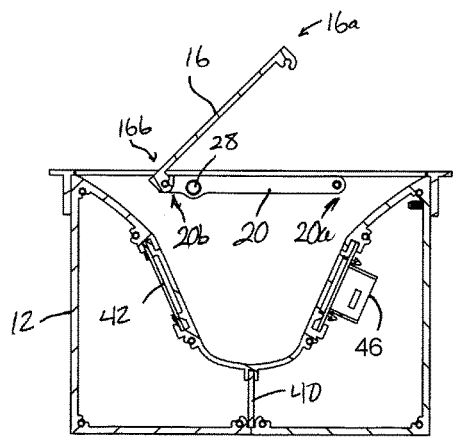
FIG. 6B is a side sectional elevation taken along line B-B in FIG. 6.

Likewise, when the cover 16 is pivoted open in the second direction (curved arrow in FIG. 1C) about the second pivot axis A2, it is substantially prevented from pivoting about the first pivot axis A1 until the cover 16 has first been closed. This is because when cover 16 is in the second open configuration of FIG. 1C, the pivot connection between the proximal end 22a of second pivot arm 22 prevents cover 16 from being lifted away from the housing 12 and restricts the cover's movement to only pivoting about the second pivot axis A2. A snap-on hook 24b formed at the second end 16b of cover 16 secures the cover 16 to another pivot pin 26 along the second pivot axis A2, such as shown in FIGS. 6A and 6A-1.

Figure 4:
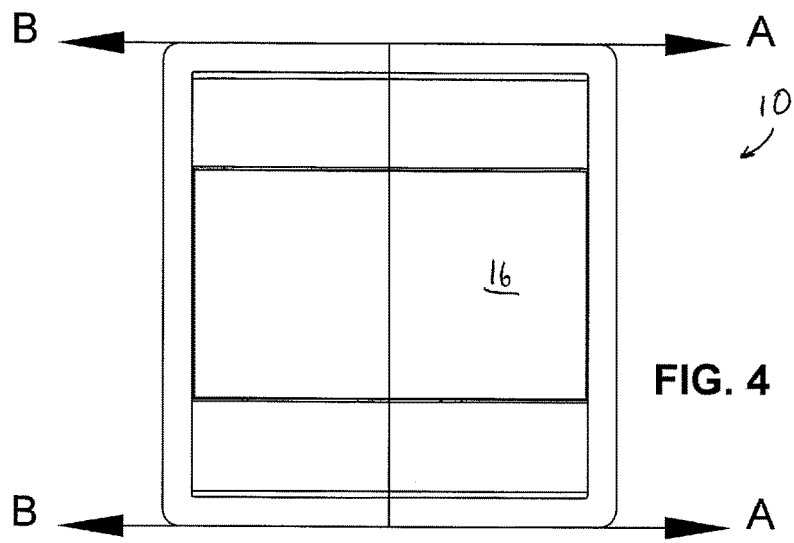
FIG. 4 is a top plan view of the electrical box with the cover in the closed position.
Figure 4A:
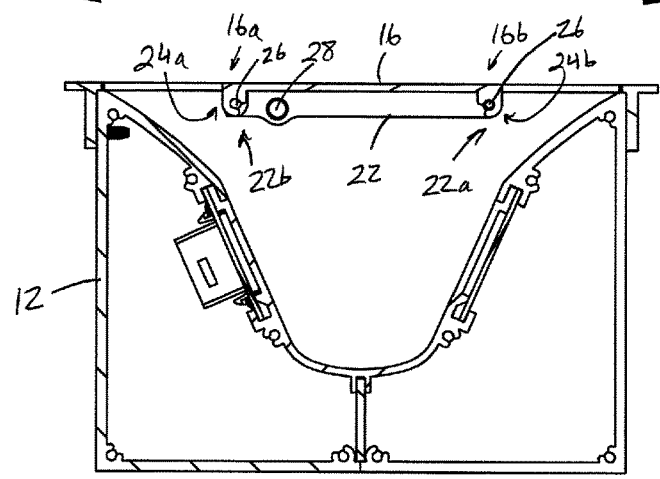
FIG. 4A is a side sectional elevation taken along line A-A in FIG. 4.
Figure 4B:
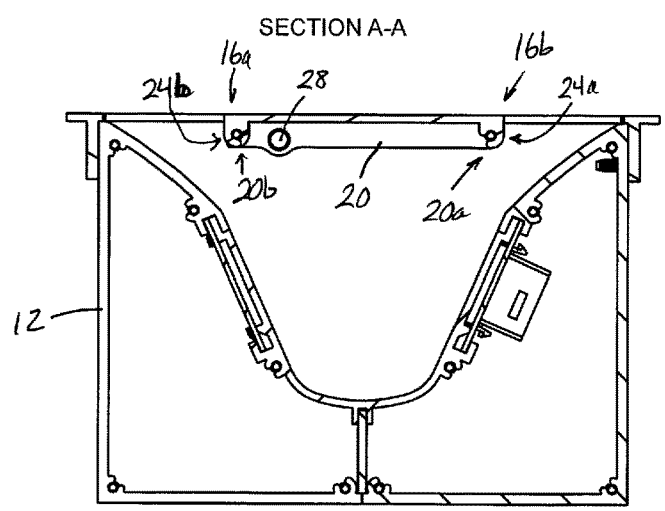
FIG. 4B is a side sectional elevation taken along line B-B in FIG. 4.
Figure 6:
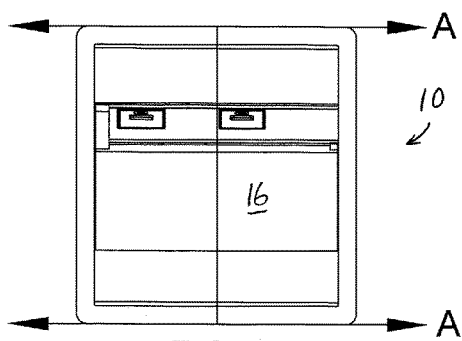
FIG. 6 is a top plan view of the electrical box with the cover in the second open position.

Although the cover 16 is said to be "substantially prevented" from pivoting about the second pivot axis A2 when the cover has already been pivoted open about the first pivot axis, it will be appreciated that when the cover 16 is pivoted open about the first axis A1, sufficient force could be applied so as to separate the snap-on hook 24a from the pivot pin 26 that is along the first pivot axis A1, or to partially raise the distal end 22b of the second pivot arm 22 in a manner that causes twisting of the cover 16. Likewise, when the cover 16 is pivoted open about the second axis A2, sufficient force could be applied so as to separate a second snap-on hook 24b from a pivot pin 26 that is along the second pivot axis A2, or to partially raise the distal end 20b of the first pivot arm 20 in a manner that causes twisting of the cover 16. Thus, while the cover 16 is substantially prevented from moving in the manners specified above during normal use, it will be understood that sufficient force could be used to detach the cover from one or both pivot arms 20, 22, or to cause deflections of the cover 16 and/or the pivot arms 20, 22, and potentially also cause deflections of the housing sidewalls 12a, 12b, when different forces are applied that are not typical of normal opening and closing use of the cover 16. Similarly, cover 16 cannot be lifted straight up from the closed position (FIGS. 1B and 2B) and away from housing 12 and its opening 14 without bending or twisting the pivot arms 20, 22, unless both pivot pins 26 are first disengaged from the respective snap-on hooks 24a, 24b, as can be envisioned with reference to FIGS. 4A and 4B.

Figure 7:
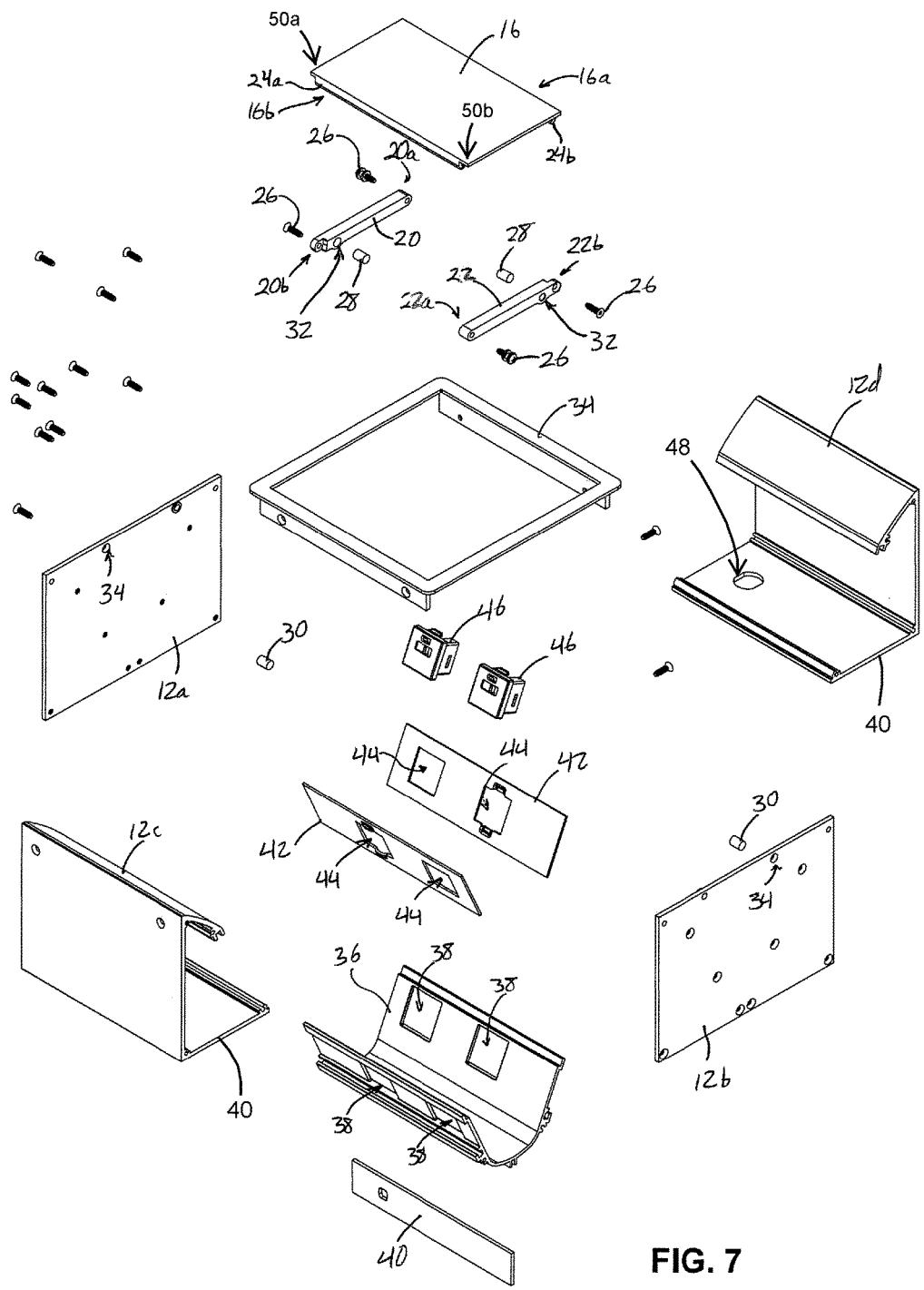
FIG. 7 is an exploded perspective view of the electrical box with dual-hinged cover.
Figure 8A:
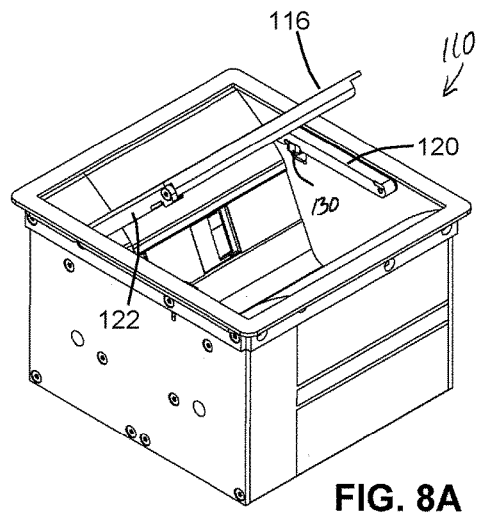
FIGS. 8A and 8B are top perspective views of another electrical box with dual-hinged cover in accordance with the present invention, viewed respectively from front-right and front left, and shown with the cover in a first open position.
Figure 8B:
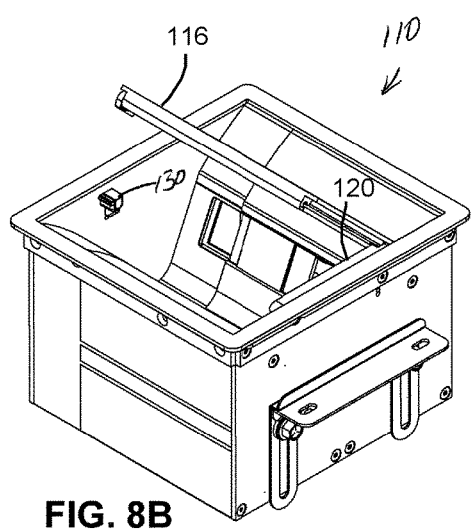
Figure 9A:
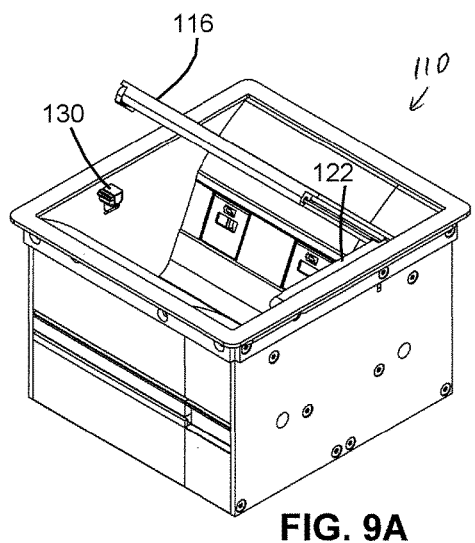
FIGS. 9A and 9B are top perspective views of the electrical box of FIGS. 8A and 8B, viewed respectively from front-right and front left, and shown with the cover in a second open position.
Figure 9B:
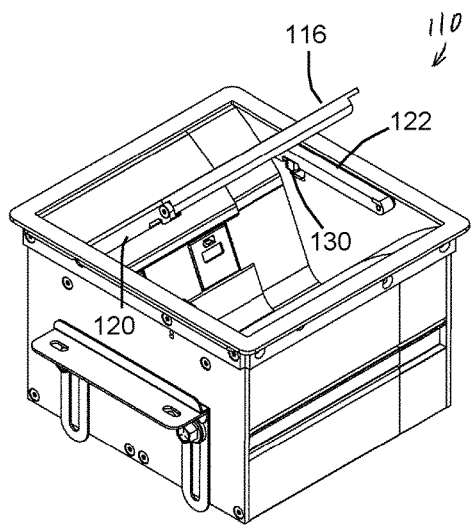
Figure 10:
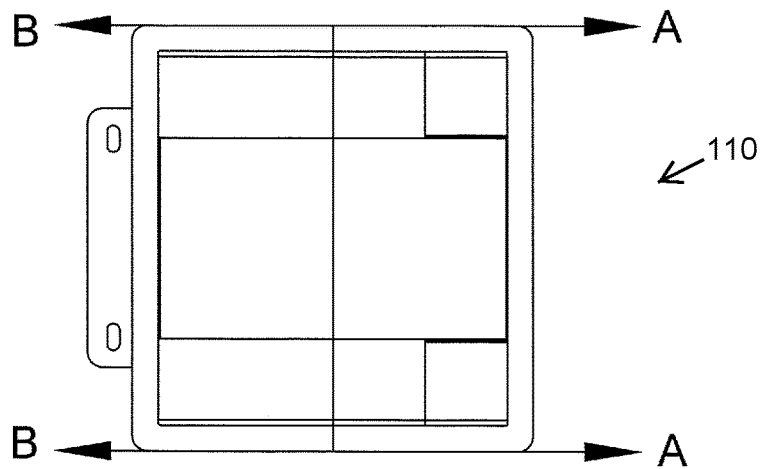
FIG. 10 is a top plan view of the electrical box of FIGS. 8A-9B, shown with the cover in a closed position.
Figure 10A:
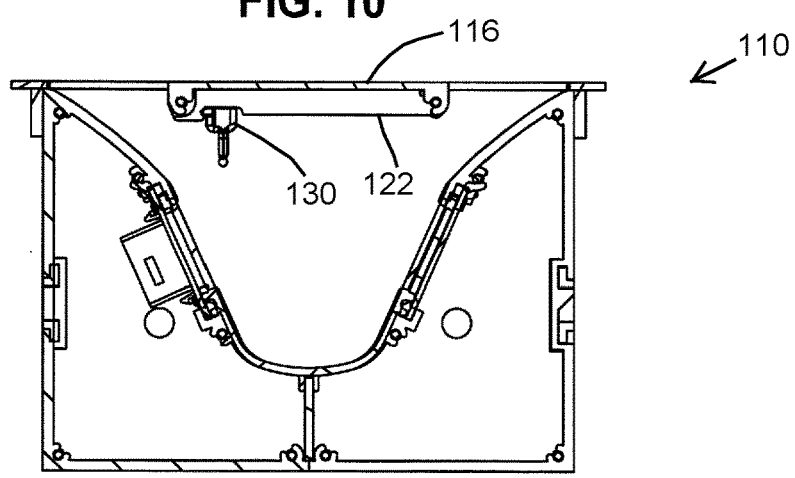
FIG. 10A is a side sectional elevation taken along line A-A in FIG. 10.
Figure 10B:
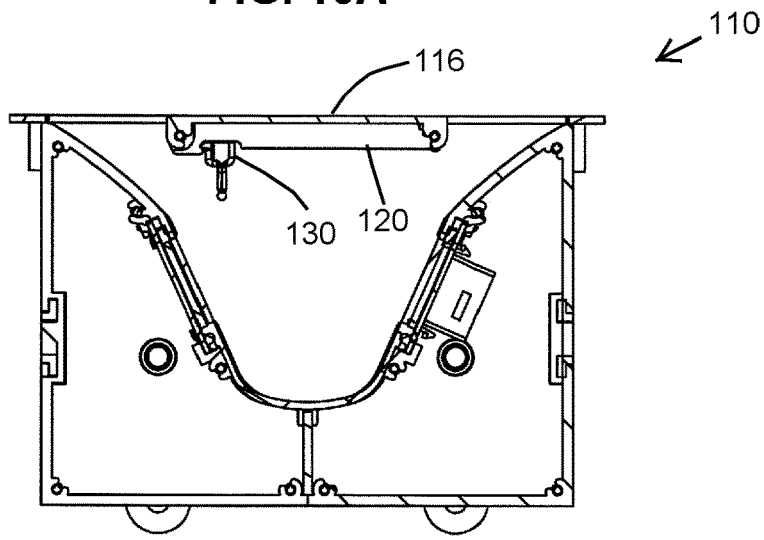
FIG. 10B is a side sectional elevation taken along line B-B in FIG. 10.
Figure 11:
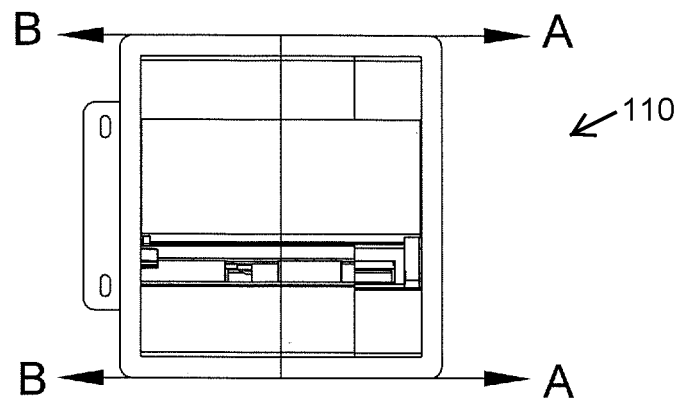
FIG. 11 is a top plan view of the electrical box of FIGS. 8A-9B, shown with the cover in the second open position.
Figure 11A:
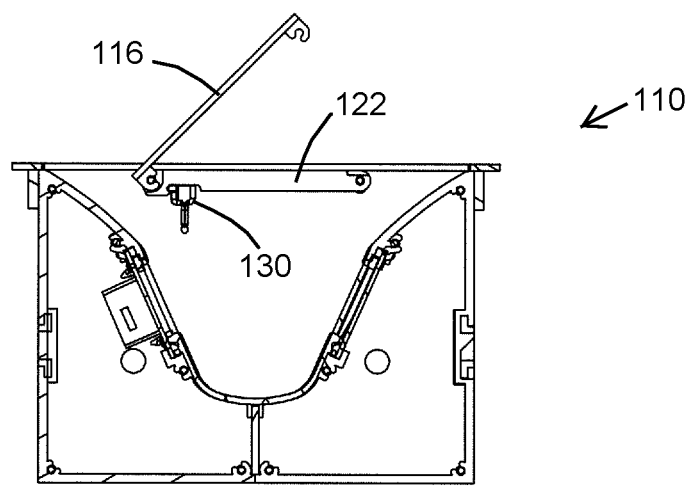
FIG. 11A is a side sectional elevation taken along line A-A in FIG. 11.
Figure 11B:
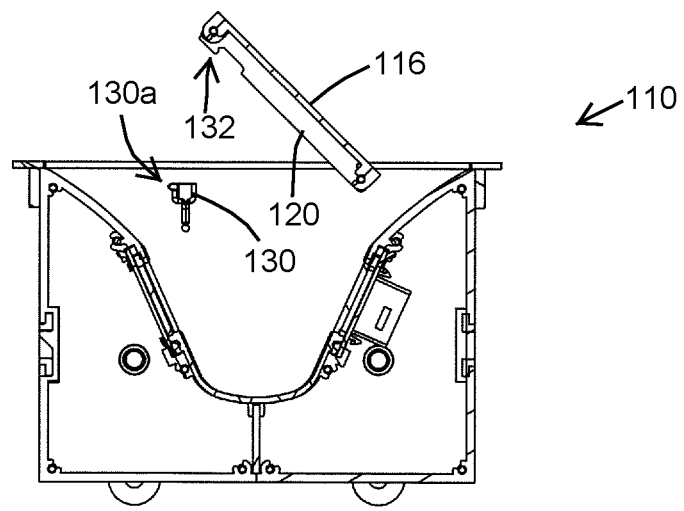
FIG. 11B is a side sectional elevation taken along line B-B in FIG. 11.
Figure 12:
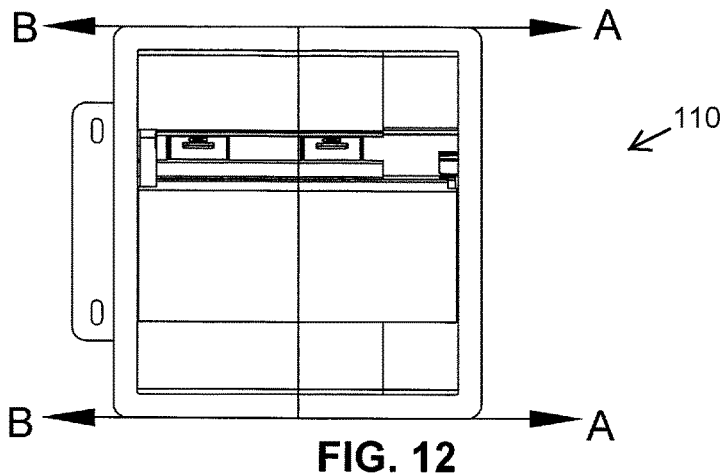
FIG. 12 is a top plan view of the electrical box of FIGS. 8A-9B, shown with the cover in the first open position.
Figure 12A:
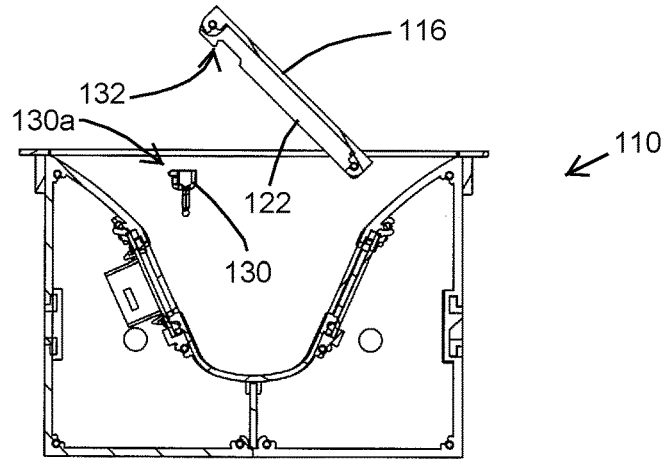
FIG. 12A is a side sectional elevation taken along line A-A in FIG. 12.
Figure 12B:
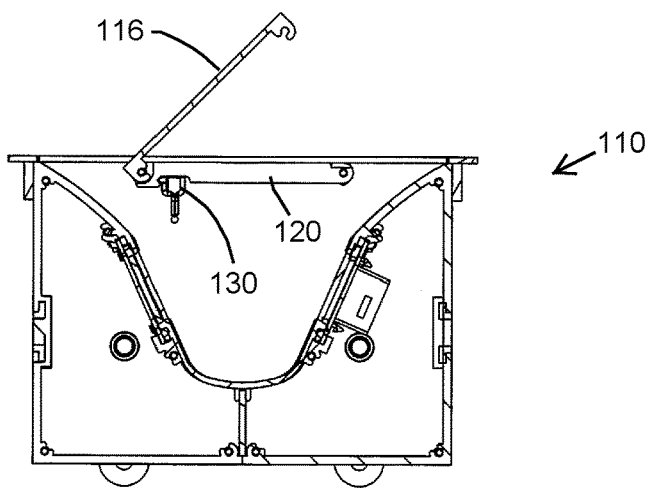
FIG. 12B is a side sectional elevation taken along line B-B in FIG. 12.

In the illustrated embodiment of FIGS. 1-7, cover-retaining elements in the form of magnets 28, 30 are used to provide a latching function and sensory ("haptic") feedback to a user, indicating when the cover has been fully closed and can again be opened in either direction. Referring to FIG. 7, an arm magnet 28 is mounted in a respective arm bore 32 formed at the distal end 20b, 22b of each pivot arm 20, 22. A corresponding housing magnet 30 is mounted in a respective bore 34 formed in each of the first sidewall 12a and the second sidewall 12b. The arm magnets 28 may be somewhat loosely retained in their respective arm bores 32, so that the arm magnets 28 are free to make at least small movements within the bores 32. When one of the arm magnets 28 is placed in close proximity to a corresponding one of the housing magnets 32, the arm magnet 28 may "snap" into a position within the arm bore 32 that is furthest outboard, being drawn to the nearby housing magnet 30 by magnetic attraction due to opposite magnetic polarities of the adjacent magnets 28, 30. The movement of the arm magnet 28 may produce an audible sound and/or brief vibration that is detectable by the hand of a user, thus providing sensory or haptic feedback to the user indicating that the cover 16 is closed. In the illustrated embodiment the arm magnets 28 do not contact the housing magnets 30 at any time during normal opening and closing operation of the cover 16. The arm magnets' 28 attraction to the housing magnets 30 when the cover 16 is closed helps to retain the cover in the closed position, but the attraction is not so strong so as to make it difficult to manually open the cover 16. It will be appreciated that a magnetically permeable material such as iron or steel may be substituted for some of the magnets described above, without departing from the spirit and scope of the present invention.

Other components of the electrical power and/or electronic data center 10 include a front housing piece 12c and a rear housing piece 12d, which cooperate with the left and right sidewalls 12a, 12b to enclose an interior of the center. A top bezel 34 forms the upper portions of housing 12 and may rest atop a work surface when the center 10 is inserted into an opening formed in the work surface. Inside the housing 12 there is a generally U-shaped electrical outlet support 36 with openings 38 formed in its upwardly-extending legs (FIG. 7), a bottom support wall 40 that extends from a lower bight portion of the outlet support 36 to fit between bottom wall portions of the front and rear housing pieces 12c, 12d. Additional outlet support plates 42 with respective openings 44 mount behind the upwardly-extending walls of the U-shaped electrical outlet support 36, and are used to secure electrical outlets 46 for access to users through the top opening 14, such as shown in the sectional views. Bottom support wall 40 defines one or more openings 48 (FIG. 3) through which wiring (not shown) for outlets 46 may pass, optionally with strain relief grommets provided at each opening. Outlets 46 may be high voltage AC power outlets, low voltage (e.g., under 30 volt) DC power outlets, or substantially any type of electronic data or signal outlet or receptacle.

The arrangement described hereinabove with reference to FIGS. 1-7 permits cover 16 to be mounted within bezel 34, and with a gap formed between each perimeter edge (including first end 16a, second end 16b, a first side 16c and a second side 16d opposite the first side 16c) of cover 16 and a corresponding inner perimeter edge of bezel 34 when the cover 16 is closed. In that arrangement, a top surface 50 of the cover 16 may be set flush with a top surface of bezel 34 when the cover is closed, such as shown in FIGS. 1B, 2B, and 4-4B. First pivot arm 20a is obscured from view by a first overhang region 50a of top surface 50 at the first side 16c of the cover 16, and second pivot arm 20b is obscured from view by second overhang region 50b of the top surface 50 at the second side 16d of the cover. In the illustrated embodiment of FIGS. 1-7, a larger gap is formed between the opposite ends 16a, 16b of the cover 16 and the corresponding portions of the bezel 34 and the corresponding front and rear housing pieces 12c, 12d. These over-size gaps provide extra clearance for data and/or power cords to exit the open upper end 14 of the main housing 12 while the door 16 is closed. In this manner, larger electrical plugs (including electrical power transformers with integrated plugs) may be connected to outlets 46 inside the main housing 12 with the door 16 open, and then the door 16 can be closed with cords protruding through the larger gaps.

Figure 1B:
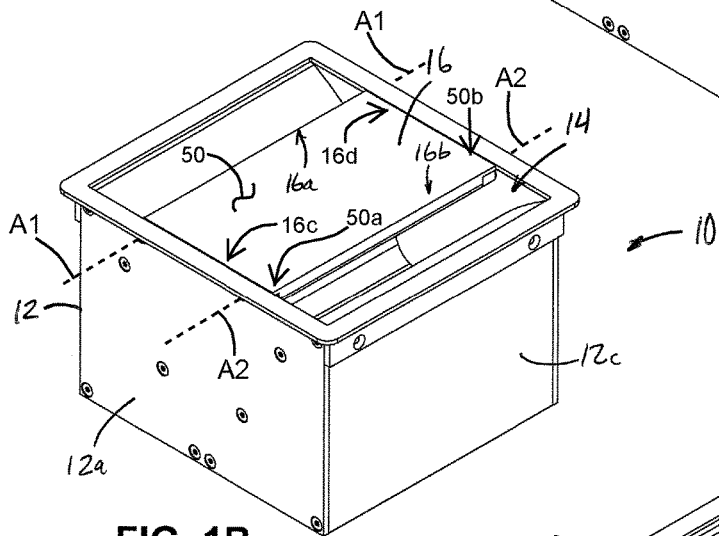
FIG. 1B is another top perspective view of the electrical box, viewed from front-right and shown with the cover in a closed position.
Figure 1C:
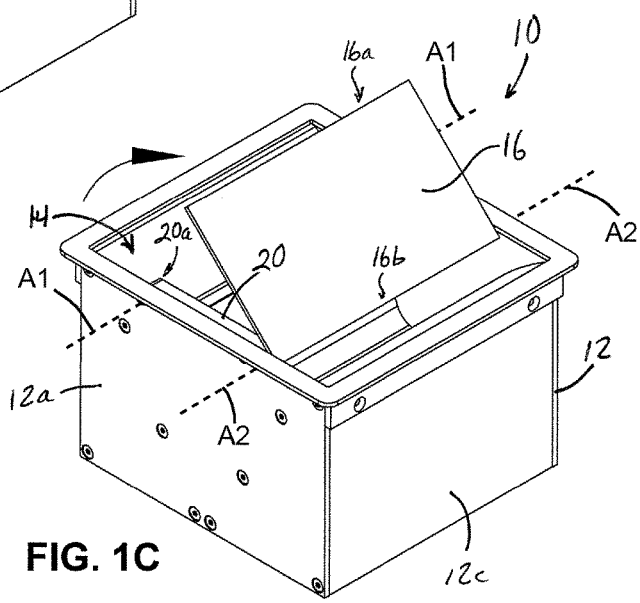
FIG. 1C is another top perspective view of the electrical box, viewed from front-right and shown with the cover in a second open position that is different from the first open position of FIG. 1A.
Figure 2A:
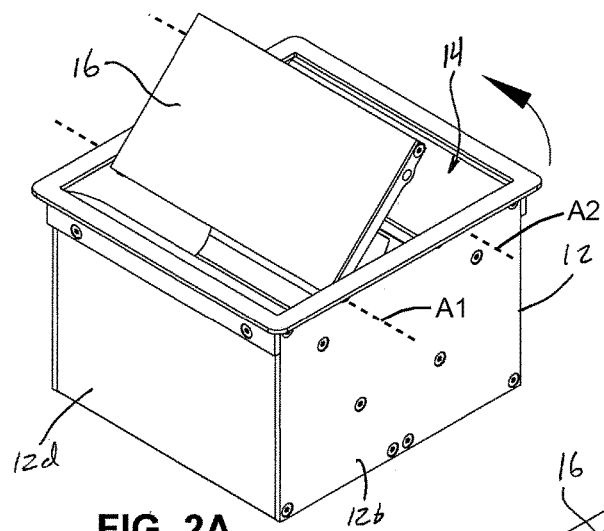
FIG. 2A is another top perspective view of the electrical box of FIG. 1A, viewed from back-right.
Figure 2B:
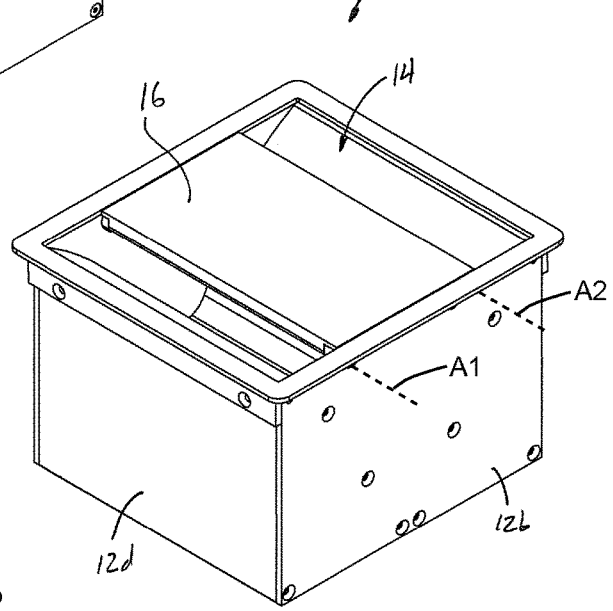
FIG. 2B is another top perspective view of the electrical box of FIG. 1B, viewed from back-right and shown with the cover in a closed position.
Figure 2C:
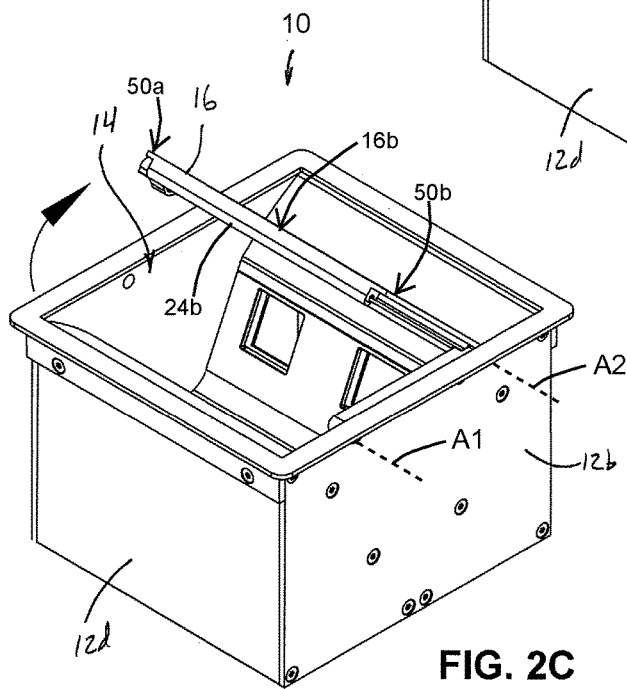
FIG. 2C is another top perspective view of the electrical box of FIG. 1C, viewed from back-right.
Figure 3:
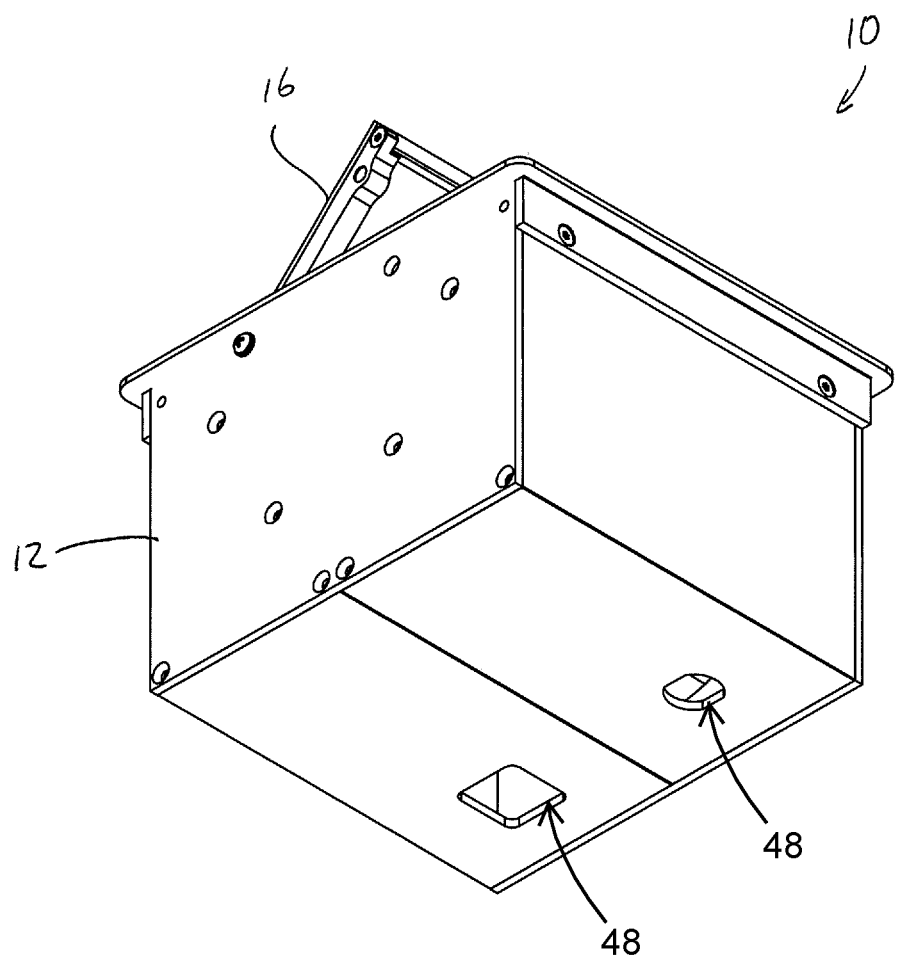
FIG. 3 is a bottom perspective view of the electrical box.

As can be seen in FIGS. 1A and 2C, the second snap-on hook 24b extends further along the second end 16b of cover 16 in the direction of first side 16c and first overhang region 50a, than it extends in the direction of second side 16d and second overhang region 50b. This provides wider clearance for the wider proximal end 22a of the second arm 22, under the second overhang region 50b at second end 16b of the cover 16, and narrower clearance for the narrower distal end 20b of the first arm 22 under the first overhang region 50a at second end 16b of the cover 16. The first snap-on hook 24b has the appearance of being slightly laterally offset relative to the second snap-on hook 24a, because at the first end 16a of the cover 16 there is located the wider proximal end 20a of the first pivot arm 20 under the cover's first side 16c, and the narrower distal end 22b of the second pivot arm 22 under the cover's second side 16d. Thus, the cover 16 may have a "floating" appearance when closed, with each pivot arm 20, 22 being substantially hidden when viewed from above.

Other variations include, for example, a mechanically-latched electrical power and/or electronic data center 110 of FIGS. 8A-12B, which is functionally similar to the electrical power and/or electronic data center 10 described above. The mechanically latched unit 110 uses cover retaining elements in the form of mechanical latches 130 instead of magnets to provide a lid-latching feature, as will be understood with reference to the drawings. In the illustrated embodiment, and as best shown in FIGS. 11A-11B, 12A-12B, each mechanical latch 130 has a horizontal protrusion or nose 130a that is engaged by an edge of a respective recess-type catch 132 formed along a lower region of each pivot arm 120, 122, as the cover 116 is opened and closed. Mechanical latches 130 and catches 132 may be made from resilient materials, such as resinous plastic, to permit limited deflection during latching and unlatching.

Accordingly, the electrical power and/or electronic data center of the present invention provides users with access to electrical or electronic data outlets in a cavity that may be recessed into a work surface such as a table or desk. To facilitate inserting or removing plugs or other connectors at the outlets, the dual-hinged door provides convenient access to the cavity from opposite sides thereof, as the door can be opened about two different pivot axes and in different pivot directions. An optional magnet or other form of releasable latch can be used to secure the door in the closed position, and may provide sensory feedback indicating that the door is fully closed.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An outlet box with dual-hinged cover, comprising:
   a housing defining an opening and comprising a pair of spaced-apart sidewalls;
   a cover coupled to said housing and positionable inside said opening;
   a pair of spaced-apart pivot arms at opposite sides of said cover, said pivot arms having respective distal end portions pivotably coupled to said cover at opposite ends of said cover, and said pivot arms having proximal end portions pivotably coupled to respective ones of said sidewalls; and
   a retaining element at each of said first and second pivot arms and a corresponding retaining element at each of said sidewalls, wherein each of said corresponding retaining elements is configured to interact with a corresponding one of said retaining elements to releasably secure said cover in a closed position, and to provide sensory feedback to a user as said cover moves from an open position to the closed position;

wherein said cover is openable from the closed position in a first direction about a first pivot axis extending through said proximal end portion of a first of said pivot arms, and said cover is openable from the closed position in a second direction about a second pivot axis extending through said proximal end portion of a second of said pivot arms.

2. The outlet box of claim 1, wherein said cover comprises respective first and second overhang regions at opposite sides thereof, said first and second overhang regions positioned directly over the entireties of respective ones of said first and second pivot arms when said cover is in the closed position.

3. The outlet box of claim 1, wherein each of said retaining elements is positioned between said proximal end and said distal end of a respective one of said first and second pivot arms.

4. The outlet box of claim 3, wherein each of said retaining elements and each of said corresponding retaining elements comprises a magnet or a magnetically permeable material.

5. The outlet box of claim 4, wherein said first and second pivot arms define respective cavities for receiving respective ones of said retaining elements, wherein said cavities are larger than said retaining elements, and wherein said retaining elements are movable within said cavities in response to close proximity with a respective one of said corresponding retaining elements upon closing of said cover.

6. The outlet box of claim 1, wherein said corresponding retaining elements comprise respective protrusions and said retaining elements comprise respective catches formed in said pivot arms.

7. The outlet box of claim 1, wherein said cover is sized and shaped to fit within said opening without said cover directly contacting any portion of said housing when said cover is in the closed position.

8. The outlet box of claim 7, wherein said cover is coupled to said housing only via said first and second pivot arms.

9. The outlet box of claim 8, wherein said cover is continuously coupled to said housing via said first and second pivot arms in said closed position, when opened in the first direction, and when opened in the second direction.

10. The outlet box of claim 1, wherein said cover comprises a snap-on hook at each opposite end thereof, wherein said distal ends of said pivot arms are pivotably coupled to respective ones of said snap-on hooks via respective pivot pins.

11. An outlet box with dual-hinged cover, comprising:
a housing defining an opening having first and second sides opposite one another and first and second ends opposite one another;
a cover coupled to said housing at said opening and having first and second sides opposite one another and positioned adjacent said first and second sides of said housing, respectively, when said cover is in a closed position;
an outlet support coupled to said housing below said opening, wherein access to said outlet support is limited by said cover in the closed position;
a first pivot arm at said first side of said cover and a second pivot arm at said second side of said cover, said first pivot arm having a proximal end pivotably coupled to said first side of said housing and a distal end pivotably coupled to said first side of said cover, and said second pivot arm having a proximal end pivotably coupled to said second side of said housing and a distal end pivotably coupled to said second side of said cover;
wherein said cover is pivotably openable from the closed position in a first direction about a first pivot axis defined through said proximal end of said first pivot arm and said distal end of said second pivot arm;
wherein said cover is pivotably openable from the closed position in a second direction about a second pivot axis defined through said proximal end of said second pivot arm and said distal end of said first pivot arm;
wherein said first and second pivot arms are configured to preclude pivoting of said cover about said second pivot axis when said cover is opened in said first direction, and said first and second pivot arms are configured to preclude pivoting of said cover about said first pivot axis when said cover is opened in said second direction.

12. The outlet box of claim 11, wherein said cover comprises respective first and second overhang regions at said first and second sides, said first and second overhang regions positioned directly over the entireties of respective ones of said first and second pivot arms when said cover is in the closed position.

13. The outlet box of claim 11, further comprising a retaining element at each of said first and second pivot arms, and a corresponding retaining element at each of said first and second sides of said housing, wherein each of said corresponding retaining element is configured to interact with a corresponding one of said retaining elements to releasably secure said door in the closed position.

14. The outlet box of claim 13, wherein each of said retaining elements is positioned between said proximal end and said distal end of a respective one of said first and second pivot arms.

15. The outlet box of claim 13, wherein each of said retaining elements and each of said corresponding retaining elements comprises a magnet or a magnetically permeable material.

16. The outlet box of claim 15, wherein said first and second pivot arms define respective cavities for receiving respective ones of said retaining elements, wherein said cavities are larger than said retaining elements, and wherein said retaining elements are movable within said cavities in response to close proximity with a respective one of said corresponding retaining elements, to provide sensory feedback to a user when said cover is moved from an open position to the closed position.

17. The outlet box of claim 13, wherein said corresponding retaining elements comprise respective protrusions and said retaining elements comprise respective catches.

18. The outlet box of claim 11, wherein said cover is sized and shaped to fit within said opening without said cover directly contacting any portion of said housing when said cover is in the closed position.

19. The outlet box of claim 11, wherein said cover is coupled to said housing only via said first and second pivot arms.

20. The outlet box of claim 19, wherein said cover is continuously coupled to said housing via said first and second pivot arms in said closed position, when opened in the first direction, and when opened in the second direction.

* * * * *